Patented Mar. 23, 1937

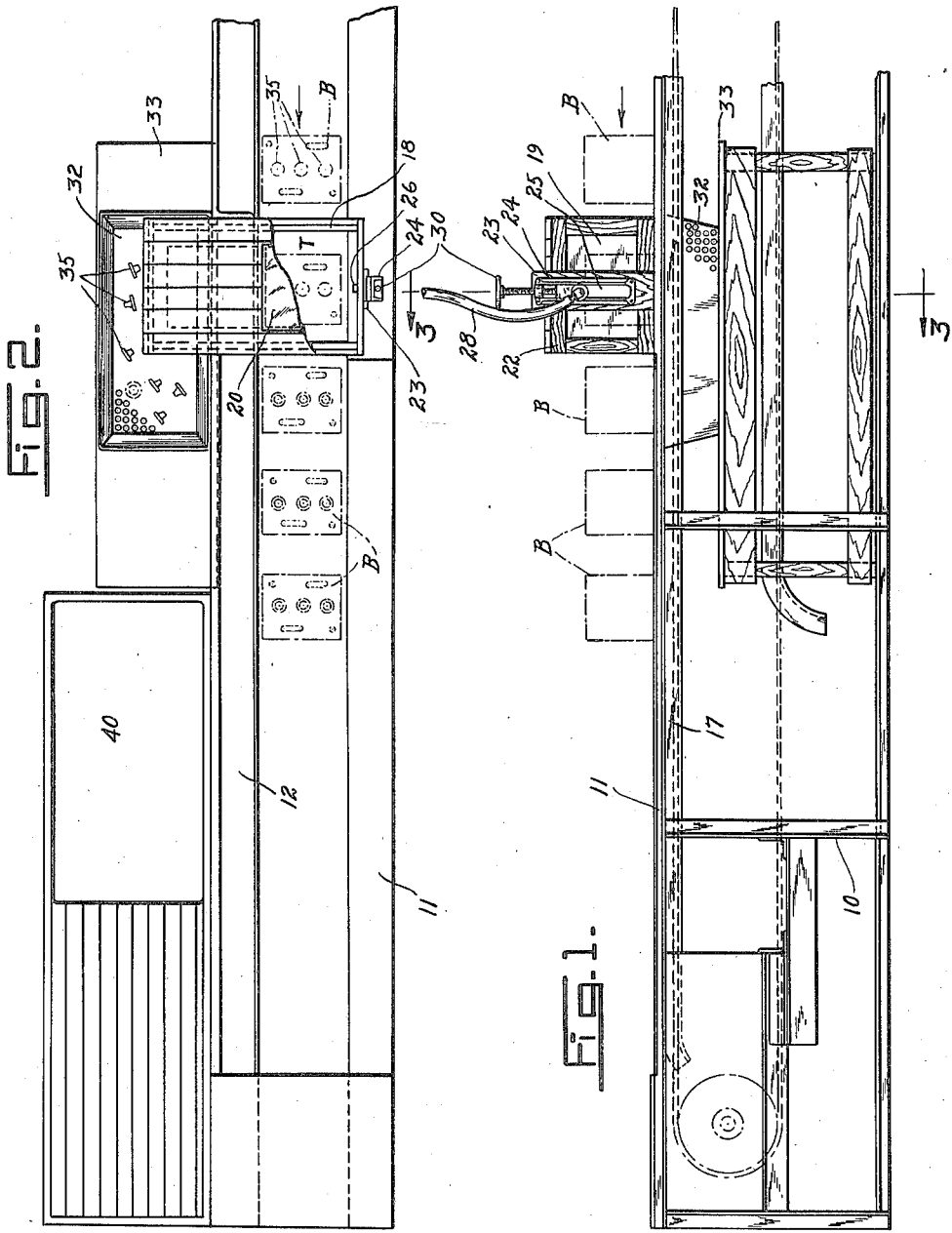

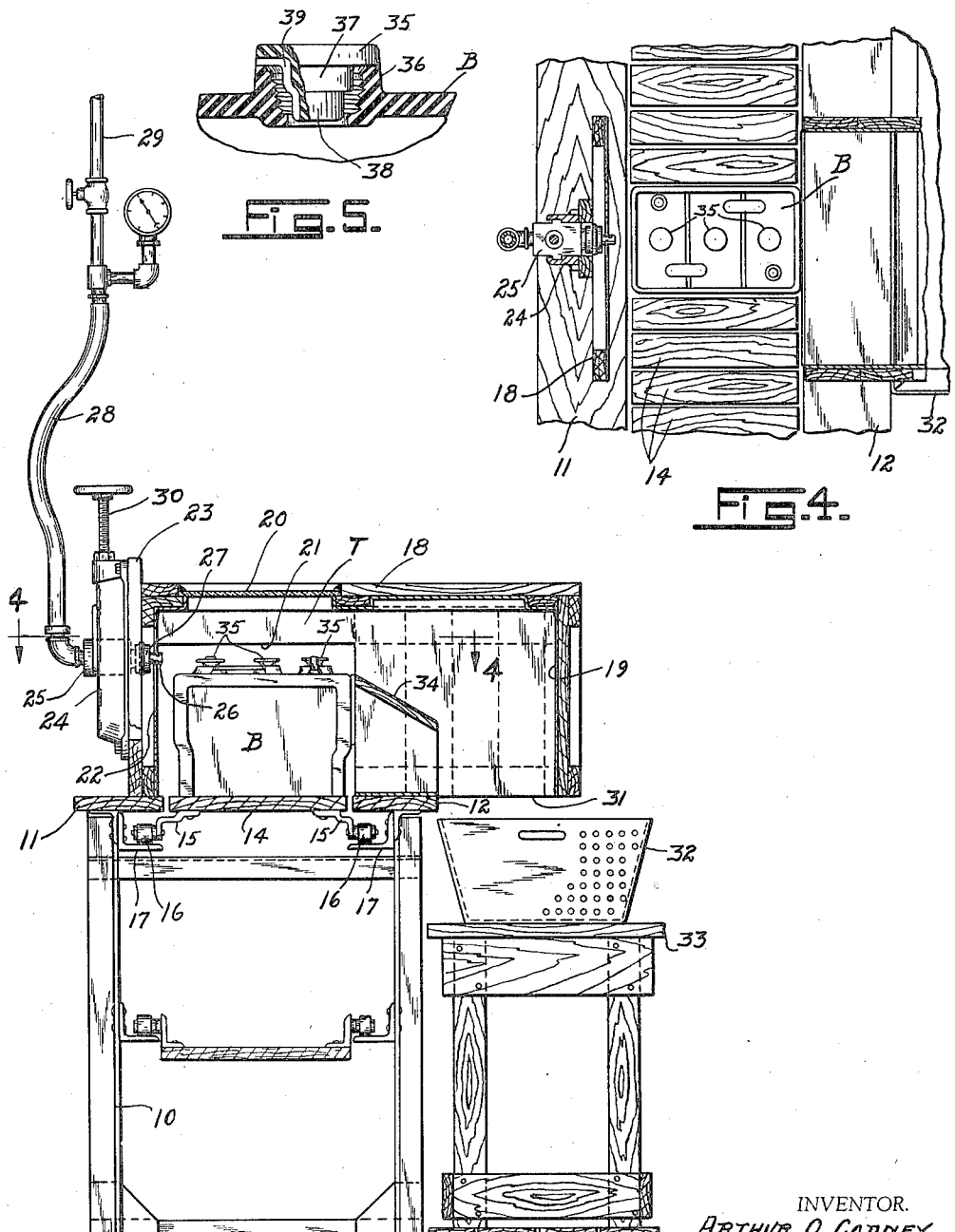

2,074,681

UNITED STATES PATENT OFFICE 2,074,681

METHOD AND APPARATUS FOR REMOVING CHARGING PLUGS FROM BATTERIES

Arthur O. Codney, Cleveland Heights, Ohio, assignor to Willard Storage Battery Company, Cleveland, Ohio, a corporation of West Virginia Application April 1, 1935, Serial No. 14,089

14 Claims. (Cl. 136—176)

This invention relates to improvements in apparatus for removing charging plugs from batteries.

In the course of the manufacture of storage batteries, after assembly of the same, they must be charged. The charging operation involves placing electrolyte in the cells of the battery and connecting the terminals thereof to a charging circuit. The charging operation takes several days time, and during this period it is necessary or advisable that an operator take several hydrometer readings for each cell. This could be done very quickly if it were feasible to leave each vent hole open, but that is not practical inasmuch as it would permit a large amount of electrolyte to be carried through the openings in the form of spray, which would be objectionable for various reasons. These vent openings are internally threaded, and in the batteries as sold, threaded plugs close the openings, small holes being provided in the plugs for venting purposes. The usual procedure has been for the operator, during the charging operation in the factory, to unscrew these threaded plugs whenever a hydrometer is to be inserted, and after the reading is taken to screw the plug back into its socket again, thereby consuming considerable time in the aggregate. In order to lessen materially the time spent in removing and replacing these plugs, I have previously devised a special type of plug to be used in the factory only, which is devoid of threads but is provided with a rim that rests upon the rim of the boss surrounding the plug opening, and has a central downwardly extending portion of smaller diameter than the threads of the ordinary plug the purpose of which is to prevent accidental dislodgement of the plug laterally. This plug is covered by my Patent No. 1,978,449, issued October 30, 1934.

When the charging operation is completed, the special charging plugs referred to are of course removed and threaded plugs are substituted. The removal of the charging plugs preparatory to inserting regular threaded plugs can of course be effected by hand, but the present invention has to do with an automatic operation whereby the charging plugs are removed from the batteries as they travel along a conveyor, and are collected in a suitable receptacle. They may thereafter be washed and used over and over again indefinitely.

The principal object of the invention therefore is the provision of means for removing special charging plugs from batteries automatically.

Another object is the provision of an air blast for accomplishing such removal, and an air tunnel for preventing any electrolyte that may have collected upon the tops of the batteries and on the plugs from being blown out into the surrounding atmosphere.

Other objects and features of novelty will appear as I proceed with the description of that embodiment of the invention which, for the purposes of the present application, I have illustrated in the accompanying drawings, in which Fig. 1 is an elevational view of a conveyor with my plug removing apparatus connected therewith.

Fig. 2 is a plan view of the same.

Fig. 3 is a cross section taken substantially on the line 3—3 of Fig. 1, but on a larger scale.

Fig. 4 is a fragmental horizontal sectional view taken substantially on the line 4—4 of Fig. 3, and Fig. 5 is a fragmental vertical sectional view of a charging plug in position in a vent opening of a battery.

In the drawings I have shown a conveyor frame 10 built up of angles and other structural forms in any suitable manner, and provided with spaced flat rails 11 and 12 preferably made of wood, between which runs an endless conveyor of any suitable character. In the illustrated embodiment this conveyor comprises a series of relatively narrow boards 14 provided with metal brackets 15 carrying rollers 16 which run upon tracks 17 located beneath the rails 11 and 12. This conveyor is adapted to support and carry storage batteries, as indicated at B in the drawings.

At a suitable point along the length of the conveyor I mount a transversely arranged air tunnel T, consisting primarily of a wooden box 18 lined with sheet lead 19, and provided in its top wall with a glass window 20 directly over the conveyor, by means of which the operation of the apparatus may be observed, particularly when adjustments are to be made. In each side wall of the air tunnel there are openings 21 of a width and height sufficient to accommodate the largest batteries handled upon the conveyor, so that the batteries may travel freely crosswise of the tunnel.

In the forward end wall of the tunnel structure there is a vertical slot 22 which is covered by a plate 23 fastened to the box. The plate 23 is also slotted and is furthermore provided with a vertical guide 24 in which is movably mounted a slide 25 that carries a nozzle 26 which projects into the tunnel. The slide 25 and the nozzle 26 are connected together by a ball and socket joint 27, giving freedom of movement angularly in any direction. The outer end of the nozzle is connected by means of a flexible tube or hose 28 with a compressed air pipe line 29. Slide 25 may be raised and lowered by means of a screw 30 in order to adjust the height of the nozzle 26 to the proper level for any given size or style of batteries.

Box 18 has an open bottom, that part which overlies the conveyor and the rails 11 and 12 being closed by those parts. The box however extends beyond the conveyor table, so that a bottom opening 31 is provided, which overhangs a perforated basket or tote box 32 that is supported by a table 33 positioned directly adjacent the conveyor frame 10. 34 is a chute employed for directing the plugs into the opening 31. It may be built into the tunnel structure if desired, but it is preferably mounted on the rail 12 in such manner as to be readily removable in order that chutes of different heights may be substituted whenever the apparatus is employed for handling batteries of different heights. The upper end of the chute should be no higher than the top of the batteries.

Fig. 5 is a detailed illustration of one of the charging plugs 35 in position in a battery. The boss 36 surrounding the vent opening of the battery is threaded on its inner side, as is the usual practice, in order to receive the usual threaded plug. The charging plug 35, however, has a central depending stem which is smooth and which is formed in two steps 37 and 38 of different diameters. The top of the plug has an annular flat under surface which rests upon the top surface of the boss 36. In order to facilitate the venting of gases formed in the cell during charging, a vent groove or passage 39 is formed in the plug.

Adjacent the table 33, I may provide a washing sink 40, into which the perforated tote box 32 may be placed when filled with plugs and thoroughly washed, when the plugs will be ready for use in a further set of batteries.

The operation of the apparatus it is believed will be obvious from the foregoing description. However, it may be stated that as the batteries B travel along the conveyor, and enter the air tunnel, when they reach substantially the position illustrated in Figs. 3 and 4 the constantly flowing blast of air issuing from nozzle 26 will strike the plugs 35, dislodge them from the bosses 36, and carry them off over the chute 34 and down through the opening 31 into tote box 32. Incidentally the same operation will clean off the top of the battery, removing any foreign material which may have been deposited upon the battery cover. Succeeding batteries will be acted upon in the same way.

Whenever a series of batteries of a different height is to be handled on the conveyor, adjustments of the nozzle are necessary. In such cases a battery B of the size to be handled is placed upon the conveyor, after which the latter may be operated by hand to bring the battery into operative position in front of the nozzle. The air is then turned on and its action upon the plugs observed through the window 20. If the action is not satisfactory the nozzle 26 is adjusted up or down, or swung upon its ball and socket joint, to make the level and direction of the air stream such as to do its work effectively. The conveyor is then started and the operator observes carefully the action of the air stream as the batteries travel through the tunnel, when further and finer adjustments of the nozzle may be made if desired in order to produce the best results. When the apparatus is once satisfactorily adjusted for a given size of batteries no attention is required other than to remove the box 32 occasionally and replace it with an empty box.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. Apparatus for removing charging plugs from batteries, which comprises an elongated support for a series of batteries, an air nozzle arranged to one side of said support above the level of the tops of the batteries, means for supplying air under pressure to said nozzle, means for causing said support and air nozzle to move relatively to each other lengthwise of the support, and means on the opposite side of the support to collect the plugs blown from the batteries as such relative movement progresses.

2. Apparatus for removing charging plugs from batteries, which comprises a support over which the batteries may be moved, an air nozzle arranged to one side of said support above the level of the tops of the batteries, means for supplying air under pressure to said nozzle, a hood on the far side of said support adapted to receive the plugs when blown off the batteries, said hood having a bottom opening therethrough, and a plug collecting means below said opening.

3. Apparatus for removing charging plugs from batteries, which comprises a support over which the batteries may be moved, an air nozzle arranged to one side of said support above the level of the tops of the batteries, a mounting in which said support is angularly adjustable, means for adjusting said mounting vertically, means for supplying air under pressure to said nozzle, a hood on the far side of said support adapted to receive the plugs when blown off the batteries, and means for collecting the plugs blown into said hood.

4. Apparatus for removing charging plugs from batteries, which comprises an elongated support for a series of batteries, an air tunnel arranged transversely of said support above the level thereof, said tunnel having openings in opposite side walls thereof through which the batteries enter and leave the tunnel, an air nozzle mounted in one end wall of the tunnel to one side of said support in a position above the level of the tops of the batteries, and means for supplying air under pressure to said nozzle, the tunnel on the opposite side of said support being adapted to receive plugs blown from the batteries.

5. An air tunnel for apparatus for removing charging plugs from batteries, comprising a box adapted to extend transversely of an elongated support upon which the batteries rest, said box having openings in opposite walls thereof of a size sufficient to permit the batteries to enter the box on one side and leave it on the other, and an air nozzle arranged in an end wall of the box at a level above the tops of the batteries as they travel through the box, whereby a blast of air may be directed over the tops of the batteries to blow the plugs out of the batteries and into the tunnel on the opposite side of the batteries.

6. An air tunnel for apparatus for removing charging plugs from batteries, comprising a box adapted to extend transversely of an elongated support upon which the batteries rest, said box having openings in opposite walls thereof of a size sufficient to permit the batteries to enter the box on one side and leave it on the other, an air nozzle arranged in an end wall of the box at a level above the tops of the batteries as they travel through the box, and a window in the top of the box over the path of the batteries as they travel through the box.

7. An air tunnel for apparatus for removing charging plugs from batteries, comprising a box adapted to extend transversely of an elongated support upon which the batteries rest, said box having openings in opposite walls thereof of a size sufficient to permit the batteries to enter the box on one side and leave it on the other, an air nozzle arranged in an end wall of the box at a level above the tops of the batteries as they travel through the box, and angular adjustments for said nozzle whereby a blast of air may be directed over the tops of the batteries to blow plugs out of the batteries and into the tunnel on the opposite side of the batteries.

8. An air tunnel for apparatus for removing charging plugs from batteries, comprising a box adapted to extend transversely of an elongated support upon which the batteries rest, said box having openings in opposite walls thereof of a size sufficient to permit the batteries to enter the box on one side and leave it on the other, an air nozzle arranged in an end wall of the box at a level above the tops of the batteries as they travel through the box, and means for adjusting said nozzle up and down to provide a blast of air lengthwise of the tunnel at the proper height to blow the plugs out of the batteries and into the tunnel on the opposite side of the batteries.

9. In apparatus of the class described, a conveyor adapted to move batteries continuously in a given path, a tunnel extending transversely of said conveyor, said tunnel comprising a box with openings in opposite side walls thereof above said conveyor, whereby batteries carried by the conveyor may move into, through and out of the tunnel, an air nozzle mounted in an end wall of the tunnel at a height above the tops of the batteries traveling through the tunnel, means for supplying air under pressure to said nozzle continuously, and means in the tunnel on the opposite side of the conveyor for receiving the plugs blown from the batteries as they travel through the tunnel.

10. In apparatus of the class described, a conveyor adapted to move batteries continuously in a given path, a tunnel extending transversely of said conveyor, said tunnel comprising a box with openings in opposite side walls thereof above said conveyor, whereby batteries carried by the conveyor may move into, through and out of the tunnel, an air nozzle mounted in an end wall of the tunnel at a height above the tops of the batteries traveling through the tunnel, means for supplying air under pressure to said nozzle continuously, means in the tunnel on the opposite side of the conveyor for receiving and directing the plugs downwardly, said box having an opening in the bottom thereof at the end opposite the first named end, and means located beneath said opening for collecting the plugs.

11. Apparatus for removing charging plugs from batteries, which comprises a support for a battery, an air tunnel arranged over said support comprising a box having an acid resisting internal surface, an air nozzle arranged in an end wall of the box at a level above the top of the battery, and means for adjusting said nozzle, whereby a stream of compressed air may be brought to bear upon the top of the battery to lift the plugs out of the battery vent openings and blow them into the box on the opposite side of the battery.

12. Apparatus for removing charging plugs from batteries comprising a box into which a battery is adapted to be received, said box having on one side an outlet for air and for the charging plugs and having an air nozzle arranged at a predetermined height and angle with respect to the top of the battery whereby a stream of compressed air may be brought to bear on the top of the battery to lift the plugs out of the battery vent openings and to blow them into said outlet.

13. A method of removing charging plugs from a series of batteries, which comprises subjecting the tops of the batteries to the action of a stream of compressed air arranged at such an elevation and directed at such an angle as to lift the plugs out of the vent openings and blow them off of the batteries, and moving the air stream and the series of batteries relatively to each other for exposing new batteries progressively to the action of the air stream.

14. A method of removing charging plugs from batteries, which comprises subjecting the tops of the batteries to the action of a stream of compressed air arranged at such an elevation and directed at such an angle as to lift the plugs out of the vent openings and blow them off of the batteries, and reducing to a minimum the dispersion into the surrounding atmosphere of acid spray resulting from the presence of acid upon the tops of the batteries and upon the plugs.

ARTHUR O. CODNEY.